Aug. 18, 1931.  G. M. SMITH  1,819,007
PIPE COUPLING
Filed Jan. 17, 1930
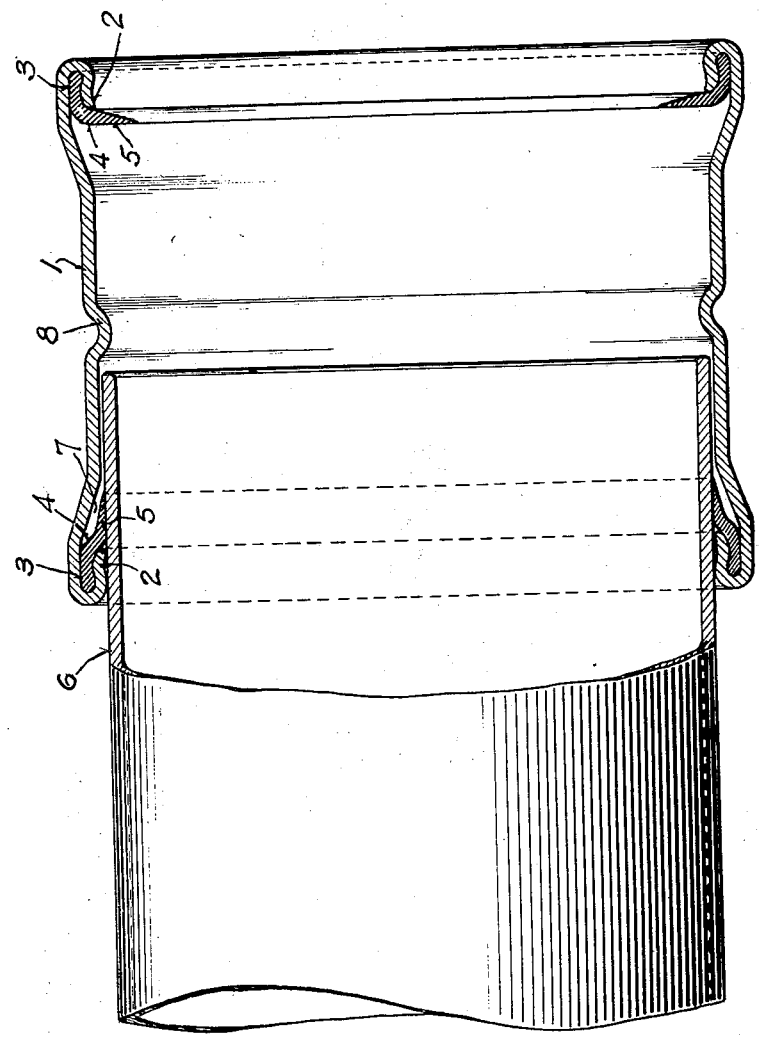
WITNESS:
Fred Palm
INVENTOR.
GEORGE M. SMITH
BY
ATTORNEY.

Patented Aug. 18, 1931

1,819,007

UNITED STATES PATENT OFFICE

GEORGE M. SMITH, OF MILWAUKEE, WISCONSIN, ASSIGNOR TO A. O. SMITH CORPORATION, OF MILWAUKEE, WISCONSIN, A CORPORATION OF NEW YORK

PIPE COUPLING

Application filed January 17, 1930. Serial No. 421,427.

The present invention relates to couplings intended primarily for use in connecting sections or lengths of plain end pipe.

An object of the invention is to provide a self sealing tubular pipe coupling which may be readily applied without bolts or adjustments.

Another object of the invention is to provide a coupling which will allow longitudinal expansion and contraction of the pipe.

A further object of the invention is to provide a tubular coupling which can be rapidly applied to the pipe.

A preferred embodiment of this invention is shown in the accompanying drawing in which the figure is a longitudinal sectional view of the coupling with a pipe in position.

The coupling 1 is preferably made of sheet metal rolled into tubular form and welded. The end edges 2 are bent back inside the coupling forming annular recesses 3 which open inwardly. In each of the recesses 3 a packing element 4 is secured by clamping or cementing or both. The packing element 4 is an annular ring of elastic material, such as rubber or fabric. The free end or tongue 5 is integral therewith and tapers to a knife edge at its extremity, and normally projects inwardly from the wall of the coupling at right angles to the longitudinal axis of the coupling.

When the pipe 6 is inserted into the coupling 1, the projecting tongue 5 of the packing ring 4 is pushed inwardly from the end of the coupling as shown in the drawing, its elasticity causing it to press tightly against the pipe 6. The coupling is so formed as to provide an annular recess 7 in which the transported fluid medium may collect and force the tongue 5 against the pipe 6 with a pressure proportionate to the pressure of the transported medium.

A centering ridge 8 is formed by pressing the metal of the coupling inwardly at or near the center of the coupling 1 and limits the distance to which the pipe 6 can be inserted in the coupling.

This type of coupling is particularly advantageous in the rapid laying of pipe lines. It can be installed without the use of tools except those which must be used in the handling of the pipe itself. It is not necessary that the pipe be carefully alined and the pipe laying can take place almost as fast as the pipe can be put into position.

While this type of coupling is particularly adaptable to emergency installations, it is nevertheless durable and efficient for permanent installations. It has the additional feature of simplicity of manufacture and consequent low initial cost.

I claim:

1. A pipe coupling comprising a sheet metal tubular member having its end edges bent back toward each other in a direction substantially parallel to the axis of the member to define an inside annular recess, a self sealing packing element in said recess, and means integral with said tubular member for centering the same with respect to the ends of the pipes to be joined.

2. A pipe coupling comprising a sheet metal tubular member having each end edge bent back toward the other to define inside annular recesses, an annular inwardly projecting bead at or near the center of said member for centering the pipes to be joined, and a packing element comprising an annular ring of elastic material seated in each of said annular recesses and having a tongue integral therewith which is adapted to provide a fluid pressure seal with the outer circumference of the pipe sections to be joined.

3. A pipe coupling comprising a sheet metal tubular member having its end portions bent back toward each other in a direction substantially parallel to the axis of the member to define inside annular recesses, and resilient sealing rings clamped in said recesses, each of said sealing rings having a free edge portion normally lying in a plane perpendicular to the axis of the coupling so as to cause said sealing ring, when the coupling member is in pipe connecting position, to closely engage said pipe by virtue of its inherent resiliency.

In testimony whereof I have signed my name at Milwaukee, Wisconsin, this 14th day of January, 1930.

GEO. M. SMITH.